(12) United States Patent
Brennan, Jr.

(10) Patent No.: US 12,088,230 B2
(45) Date of Patent: Sep. 10, 2024

(54) SYSTEMS AND CIRCUITS FOR HIGH IMPEDANCE, VOLTAGE SURGE-TOLERANT SWITCH POSITION INDICATION

(71) Applicant: Parker-Hannifin Corporation, Cleveland, OH (US)

(72) Inventor: Robert A. Brennan, Jr., Irvine, CA (US)

(73) Assignee: Parker-Hannifin Corporation, Cleveland, OH (US)

(*) Notice: Subject to any disclaimer, the term of this patent is extended or adjusted under 35 U.S.C. 154(b) by 117 days.

(21) Appl. No.: 17/923,033

(22) PCT Filed: Jul. 15, 2021

(86) PCT No.: PCT/US2021/041733
§ 371 (c)(1),
(2) Date: Nov. 3, 2022

(87) PCT Pub. No.: WO2022/060461
PCT Pub. Date: Mar. 24, 2022

(65) Prior Publication Data
US 2023/0299704 A1  Sep. 21, 2023

Related U.S. Application Data

(60) Provisional application No. 63/080,829, filed on Sep. 21, 2020, provisional application No. 63/114,592, filed on Nov. 17, 2020.

(51) Int. Cl.
*G05B 5/00* (2006.01)
*H02P 29/02* (2016.01)

(52) U.S. Cl.
CPC .................................. *H02P 29/02* (2013.01)

(58) Field of Classification Search
CPC ....... H02P 25/16; H02P 29/02; H02P 29/0241
See application file for complete search history.

(56) References Cited

U.S. PATENT DOCUMENTS 4,158,159 A  6/1979 Misterfeld et al.
4,689,535 A  8/1987 Tsunoda et al.
(Continued)

FOREIGN PATENT DOCUMENTS

CN  101593615 A  12/2009
CN  107733303 A  2/2018

OTHER PUBLICATIONS

International Search Report and Written Opinion prepared by the European Patent Office in International Application No. PCT/2021/041733 dated Jul. 15, 2021.
(Continued)

*Primary Examiner* — Karen Masih
(74) *Attorney, Agent, or Firm* — McDonnell Boehnen Hulbert & Berghoff LLP

(57) ABSTRACT

An example system includes a first surge protection module configured to receive a command signal: a motor control module configured to receive: (i) the command signal from the first surge protection module, and (ii) an enable signal, wherein the motor control module provides a control signal in response to the enable signal meeting a threshold value: a motor configured to receive the control signal from the motor control module: a switch coupled to the motor and configured to be triggered based on a state of the motor, wherein the switch comprises: (i) a first terminal configured to provide an indication signal of the state of the motor and provide the enable signal to the motor control module, and (ii) a second terminal connected to ground; and a second surge protection module coupled to the first terminal of the switch.

19 Claims, 5 Drawing Sheets

(56) References Cited

U.S. PATENT DOCUMENTS

| | | | |
|---|---|---|---|
| 6,016,965 A | 1/2000 | Yoshimura et al. | |
| 6,144,235 A | 11/2000 | Marano et al. | |
| 7,113,376 B2 | 9/2006 | Nomura et al. | |
| 2013/0037627 A1* | 2/2013 | Kikuta | A01M 7/0089 239/284.1 |

OTHER PUBLICATIONS

Examiner's Report issued by the Canadian Patent Office in application No. 3,180,244 dated Apr. 29, 2024.

* cited by examiner

IN RESPONSE TO RECEIVING THE COMMAND SIGNAL AT THE MOTOR CONTROL MODULE, GENERATING A REFERENCE VOLTAGE SIGNAL, WHEREIN PROVIDING THE ENABLE SIGNAL COMPRISES PROVIDING THE ENABLE SIGNAL IN RESPONSE TO THE REFERENCE VOLTAGE SIGNAL MEETING A THRESHOLD VOLTAGE VALUE AND THE SWITCH OPERATING IN THE FIRST STATE — 600

FIG. 6

PROVIDING THE REFERENCE VOLTAGE SIGNAL TO A GATE OF A TRANSISTOR, WHEREIN THE TRANSISTOR COMPRISES A SOURCE TERMINAL AND A DRAIN TERMINAL, WHEREIN THE DRAIN TERMINAL IS CONNECTED TO THE MOTOR CONTROL MODULE TO PROVIDE THE ENABLE SIGNAL THERETO — 700

WHEN THE REFERENCE VOLTAGE SIGNAL MEETS THE THRESHOLD VOLTAGE VALUE AND THE SWITCH IS OPERATING IN THE FIRST STATE BIASING THE GATE OF THE TRANSISTOR WITH THE REFERENCE VOLTAGE SIGNAL, THEREBY CAUSING THE SOURCE TERMINAL TO BE CONNECTED TO THE DRAIN TERMINAL TO PROVIDE THE ENABLE SIGNAL TO THE MOTOR CONTROL MODULE — 702

FIG. 7

OPERATING THE SWITCH IN THE FIRST STATE COMPRISES CONNECTING THE THIRD TERMINAL TO THE FOURTH TERMINAL — 800

OPERATING THE SWITCH IN THE SECOND STATE COMPRISES DISCONNECTING THE THIRD TERMINAL FROM THE FOURTH TERMINAL — 802

FIG. 8

SYSTEMS AND CIRCUITS FOR HIGH IMPEDANCE, VOLTAGE SURGE-TOLERANT SWITCH POSITION INDICATION

CROSS-REFERENCE TO RELATED APPLICATION

This application claims priority to U.S. Provisional Application No. 63/080,829, filed Sep. 21, 2020 and U.S. Provisional Application No. 63/114,592, filed Nov. 17, 2020, which are incorporated herein by reference in their entirety.

BACKGROUND

In some applications, a mechanical sensing switch is used to indicate a state of an actuator such as an electric motor. For instance, when the motor is actuated to a particular state, the motor triggers the switch, thereby changing an indication signal that is fed back to a controller. The controller then determines the state of the motor based on the indication signal.

In some instances, due to switch fatigue, spring imbalance, friction, contamination, etc., the switch might not operate as expected. For example, a mechanical connection can be used between the motor and a lever of the switch to trigger the switch. In some cases, connections between terminals of the switch might not form as expected due to, for example, partial movement of the lever. As a result, the switch might fail to provide a proper switch position indication.

Therefore, it may be desirable to configure the system including the switch and the associated electric circuit in a manner that alleviates such failure in providing proper switch position indication. It is with respect to these and other considerations that the disclosure made herein is presented.

SUMMARY

The present disclosure describes implementations that relate to systems and circuits for high impedance, voltage surge-tolerant switch position indication.

In a first example implementation, the present disclosure describes a system. The system includes: a first surge protection module configured to receive a command signal: a motor control module configured to receive: (i) the command signal from the first surge protection module, and (ii) an enable signal, wherein the motor control module provides a control signal in response to the enable signal meeting a threshold value: a motor configured to receive the control signal from the motor control module; a switch coupled to the motor and configured to be triggered based on a state of the motor, wherein the switch comprises: (i) a first terminal configured to provide an indication signal of the state of the motor and provide the enable signal to the motor control module, and (ii) a second terminal connected to ground; and a second surge protection module coupled to the first terminal of the switch such that the indication signal is provided from the first terminal through the second surge protection module. The switch is configured to operate in: (i) a first state wherein the first terminal and the second are disconnected, thereby allowing the enable signal to be provided to the motor control module to drive the motor, and (ii) a second state triggered by the motor reaching a desired position causing the first terminal and the second terminal to be connected, thereby grounding the indication signal and disabling the motor control module to cause the motor to stop.

In a second example implementation, the present disclosure describes a circuit. The circuit includes: a switch configured to be coupled to a motor and configured to be triggered based on a state of the motor, wherein the switch comprises: (i) a first terminal configured to provide an indication signal of the state of the motor, and (ii) a second terminal connected to ground; and a first impedance connecting the first terminal of the switch to the indication signal: a second impedance configured to receive a reference voltage signal from a motor control module of the motor; and a third impedance connected to the first impedance; and a transistor comprising: (i) a gate connected to the first terminal of the switch via the third impedance and connected to the reference voltage signal via the second impedance, (ii) a source terminal, and a (iii) a drain terminal configured to be connected to the motor control module. When the reference voltage signal meets a threshold voltage value and the switch is operating in a first state in which the first terminal is disconnected from the second terminal, the gate of the transistor is biased, thereby causing the source terminal to be connected to the drain terminal to provide an enable signal to the motor control module. The switch is configured to operate in a second state triggered by the motor reaching a desired position causing the first terminal and the second terminal to be connected, thereby grounding the indication signal and disabling the motor control module to cause the motor to stop.

In a third example implementation, the present disclosure describes a method. The method includes: (i) operating a switch in a first state, wherein the switch comprises (a) a first terminal configured to provide an indication signal of a state of a motor and provide an enable signal to a motor control module configured to drive the motor, and (b) a second terminal connected to ground, wherein operating the switch in the first state comprises the first terminal being disconnected from the second terminal: (ii) providing the enable signal from the first terminal to the motor control module to drive the motor; and (iii) in response to the motor reaching a desired position, operating the switch in a second state in which the first terminal and the second terminal are connected, thereby grounding the indication signal and disabling the motor control module to cause the motor to stop.

The foregoing summary is illustrative only and is not intended to be in any way limiting. In addition to the illustrative aspects, implementations, and features described above, further aspects, implementations, and features will become apparent by reference to the figures and the following detailed description.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying Figures.

FIG. 6 is a flowchart of additional operations that may be executed and performed with the method of FIG. 4, in accordance with an example implementation.

FIG. 7 is a flowchart of additional operations that may be executed and performed with the method of FIG. 4, in accordance with an example implementation.

FIG. 8 is a flowchart of additional operations that may be executed and performed with the method of FIG. 4, in accordance with an example implementation.

DETAILED DESCRIPTION

Disclosed herein are configurations of systems, circuits, and methods for providing both a switch position indication and actuator control from a single switch positional state. The disclosed configurations provide effective protection from high voltage surges that may occur in some applications (e.g., due to an indirect lightning in an aerospace application). The disclosed configurations also maintain a high or open impedance when the switch is opened, while maintaining closed continuity for the indication signal when the switch is closed.

Figure 1A:
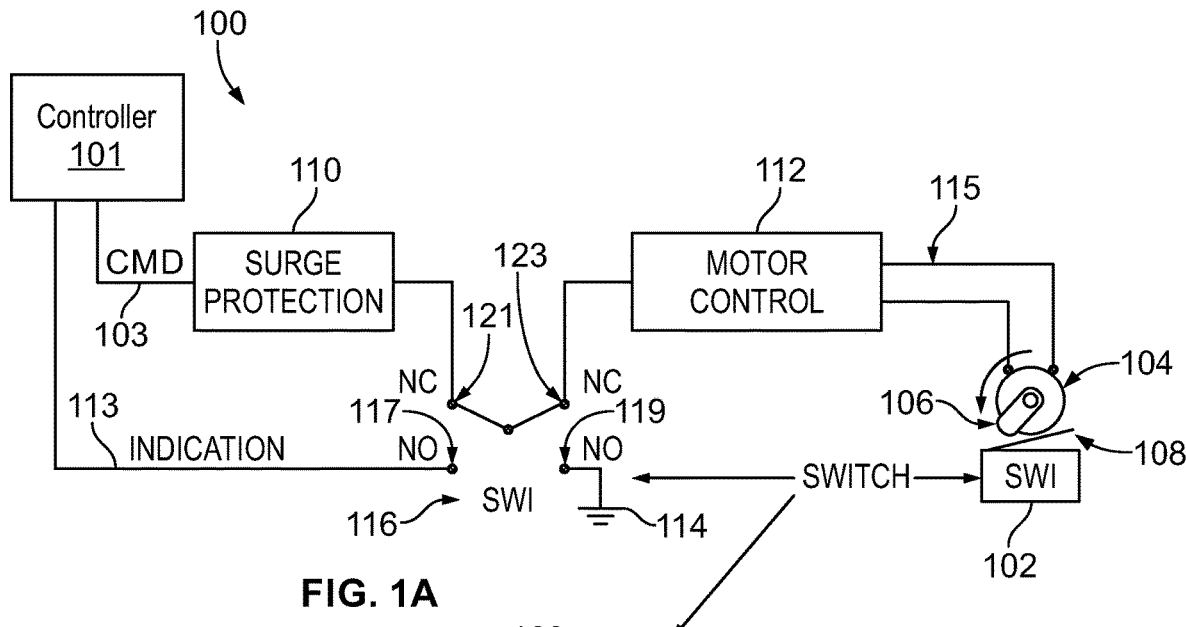
FIG. 1A illustrates system including a switch, in accordance with an example implementation.

FIG. 1A illustrates system 100 including a switch 102, in accordance with an example implementation. The switch 102 is a mechanical switch. More particularly, the switch 102 is a mechanical sensing switch that is configured to provide a sensor indication of a position or state of an actuator such as a motor 104 (e.g., an electric motor). As described below, the switch 102 can have an internal moving element (e.g., a cam, lever, etc.) that is mechanically-linked to a set of contacts. When an object comes into contact with the moving element, the switch 102 operates its contacts to make or break an electrical connection.

The system 100 receives a command signal 103 from a controller 101 of the system 100, for example. The command signal 103 is configured to operate the motor 104. The term "signal" is used throughout herein to refer to an electric signal or a line (e.g., wire or connection) transmitting the electric signal.

In the example implementation of FIG. 1A, the motor 104 is coupled to a cam 106 via an output shaft of the motor 104. In an example, the motor 104 is coupled to the cam 106 via a gear train (e.g., a gearbox) to slow down the rotational speed of the cam 106 relative to the rotational speed of the output shaft of the motor 104. As such, throughout this disclosure, the term "motor" is used generally to refer to an actuator assembly that can include an electric motor driving a gearbox. The cam 106 is configured to operate a lever 108 of the switch 102 to change a state of the switch 102. In examples, the lever 108 may be attached to a housing of the switch 102.

The system 100 includes a surge protection module 110 and a motor control module 112. The surge protection module 110 includes an electric circuit configured to limit voltage or current provided to the motor control module 112 when subjected to a high voltage surge (e.g., from a lightning surge). The motor control module 112 includes, for example, a closed-loop feedback control scheme that provides a control signal 115 (e.g., three phase power signal, an H-bridge, or direct current signal) to control operation of the motor 104 based on the command signal 103.

In an example, the switch 102 is configured as a single-pole double-throw double-break (SPDT-DB) switch. Pole refers to the number of circuits controlled by the switch 102. For instance, a single pole (SP) switch controls one electrical circuit, whereas a double pole (DP) switch controls two independent circuits (and act like two identical switches that are mechanically-linked). Throw refers to the extreme position of the actuator of the switch 102 (e.g., of the lever 108). A single throw (ST) switch closes a circuit at one position, i.e., the circuit is "On." In the other position of the lever 108, the switch opens the circuit, i.e., the circuit is "Off." A double throw (DT) switch closes a circuit in the two positions, e.g., "Up" position as well as the "Down" position (On-On). A DT switch can also have a center position (On-Off-On). A double-break (DB) switch indicates that in one switch position, both normally-closed (NC) terminals are shorted to each other and both normally-open (NO) terminals are not connected to each other, and in the other position both NO terminals are shorted to each other and both NC terminals are not connected to each other. The switch 102 is illustrated and described herein as a SPDT-DB switch; however, it should be understood that the systems and circuits described herein are applicable to other types of switches (e.g., a SPST switch). Particularly, a switch with just a first terminal and a second terminal can be used, rather than four terminals as described below.

The switch 102 includes four pins or terminals. A first terminal 117 is a normally-open (NO) contact that allows current to flow by connecting to a second terminal 119, which is also an NO terminal), when the switch 102 is triggered. A third terminal 121 is a normally-closed (NC) contact that allows current through by connecting to a fourth terminal 123, which is also an NC terminal, when the switch 102 is not triggered. The third terminal 121 is connected to the surge protection module 110, the first terminal 117 is connected to an indication signal 113 line or wire, the second terminal 119 is connected to ground 114 (e.g., earth ground), and the fourth terminal 123 is connected to the motor control module 112.

FIG. 1A illustrates the switch 102 operating in a state 116, which can be referred to as an un-triggered or "open" state. In the state 116, the NC terminals (i.e., the third terminal 121 and the fourth terminal 123) are connected, whereas the NO terminals (i.e., the first terminal 117 and the second terminal 119) are disconnected. As such, the command signal 103 applied to the surge protection module 110 passes through the third terminal 121 and the fourth terminal 123 to the motor control module 112, which then powers or actuates the motor 104. Therefore, the state 116 can also be referred to as the "powered state." Also, in the state 116, the indication signal 113 is open (i.e., not connected to the ground 114) because the first terminal 117 and the second terminal 119 are disconnected. When the indication signal 113 is open as shown in FIG. 1A, the controller 101 of the system 100 determines that the motor 104 has not yet been actuated or rotated to a desired position (e.g., a fully rotated position).

As the command signal 103 passes through the switch 102 (i.e., through the third terminal 121 and the fourth terminal 123 to the motor control module 112), the motor control module 112 supplies power to the motor 104 causing it to rotate the cam 106. The cam 106 then depresses or pushes the lever 108 until the switch 102 switches to a triggered position.

Figure 1B:
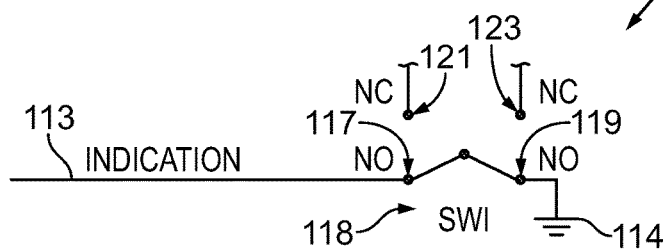
FIG. 1B illustrates a partial view of the system of FIG. 1A with the switch operating in a triggered state, in accordance with an example implementation.

FIG. 1B illustrates a partial view of the system 100 with the switch 102 operating in a triggered state 118, in accordance with an example implementation. The triggered state 118 can also be referred to as the "closed" state. In the triggered state 118, the first terminal 117 and the second terminal 119 are connected or shorted whereas the third terminal 121 and the fourth terminal 123 are disconnected. In this state, electric power is disconnected from the motor control module 112 causing the motor 104 to stop, and the indication signal 113 is grounded due to connecting or shorting the first terminal 117 and the second terminal 119. In some cases, due to switch fatigue, spring imbalance, friction, contamination, etc., the switch 102 might not operate as shown in FIG. 1B when triggered.

Figure 1C:
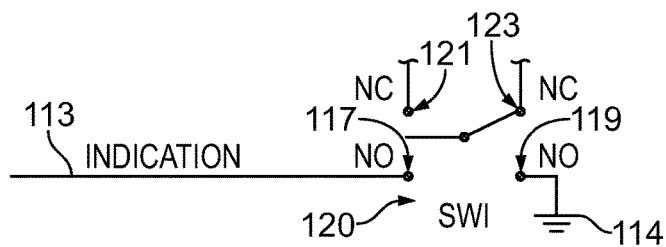
FIG. 1C illustrates a partial view of the system of FIG. 1A with the switch operating in a partially-switched state, in accordance with an example implementation.

FIG. 1C illustrates a partial view of the system 100 with the switch 102 operating in a partially-triggered or partially-switched state 120. In the partially-switched state 120, the lever 108 moves to an extent that causes the third terminal 121 to be disconnected from the surge protection module 110, and thus disconnects the power to the motor 104. However, the lever 108 might not move enough to connect the first terminal 117 and the second terminal 119, and thus the indication signal 113 is not grounded as expected.

Figure 1D:
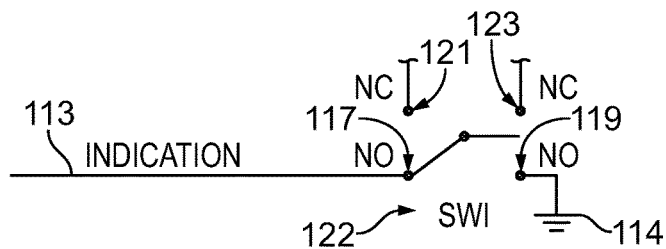
FIG. 1D illustrates a partial view of the system of FIG. 1A with the switch operating in another partially-switched state, in accordance with an example implementation.

FIG. 1D illustrates a partial view of the system 100 with the switch 102 operating in another partially-switched state 122. In the partially-switched state 122, the lever 108 moves to an extent that causes the third terminal 121 and the fourth terminal 123 to be disconnected so the motor 104 stops. However, the first terminal 117 and the second terminal 119 are not connected to each other and the indication signal 113 is not grounded as expected. In the partially-switched state 120 and the partially-switched state 122, the switch 102 does not provide a proper switch position indication to the controller 101.

In the configurations shown in FIGS. 1A-1D, the first terminal 117 and the second terminal 119 are not connected to electronic components. Therefore, surge protection of the first terminal 117 and the second terminal 119 is not required.

The scenarios shown in FIGS. 1C-1D are examples of a failure mechanism whereby the power connection to the motor controller module 112 is removed but the indication signal is not provided 113. Not all possible failure modes are represented in FIGS. 1C-1D, and other are possible, but they illustrate that it may be desirable to reconfigure the system 100 in a manner that alleviates occurrence of the scenarios shown in FIGS. 1C and 1D or other scenarios.

Figure 2A:
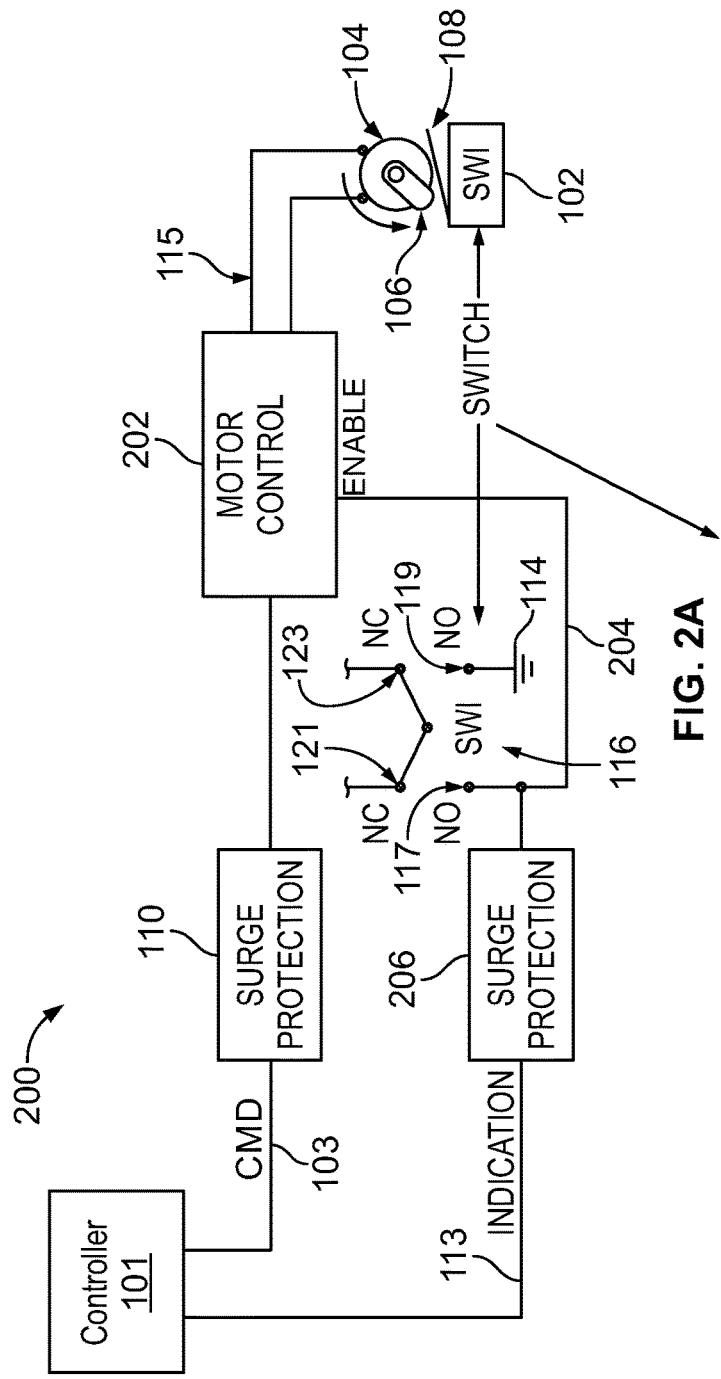
FIG. 2A illustrates a system configured to reduce the likelihood of an improper indication signal, in accordance with an example implementation.

FIG. 2A illustrates a system 200, in accordance with an example implementation. The system 200 is configured to eliminate the likelihood of an improper indication signal.

As shown in FIG. 2A, the command signal 103 is applied to the surge protection module 110 and is then provided directly to a motor control module 202, rather than passing through the switch 102 before being provided to the motor control module 202. The motor control module 202 differs from the motor control module 112 in that it receives an enable signal 204 connected to first terminal 117 of the switch 102. The motor control module 202 is configured to provide the control signal 115 and drive the motor 104 when the enable signal 204 meets a threshold, e.g., when the enable signal is "HIGH," i.e., not grounded, for example.

The switch 102 is shown in FIG. 2A operating in the state 116 where the NC terminals (the third terminal 121 and the fourth terminal 123) are connected whereas the NO terminals (the first terminal 117 and the second terminal 119) are disconnected. Because the first terminal 117 and the second terminal 119 are disconnected, the indication signal 113 is "open," i.e., not grounded.

Also, in the state 116, where the first terminal 117 and the second terminal 119 of the switch 102 are not connected, the enable signal 204 is "HIGH" (i.e., not grounded) and the motor control module 202 is enabled and drives the motor 104. As the motor 104 runs, it rotates the cam 106, and the cam 106 then depresses the lever 108 of the switch 102 until the switch 102 flips to the triggered state 118.

Figure 2B:
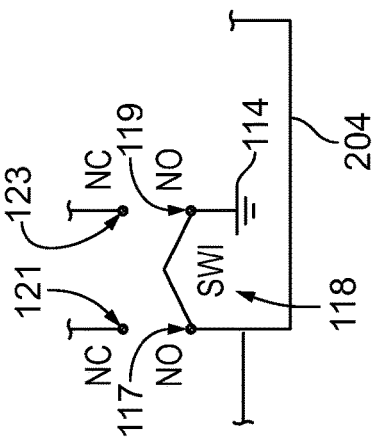
FIG. 2B illustrates a partial view of the system of FIG. 2A with a switch operating in a triggered state, in accordance with an example implementation.

FIG. 2B illustrates a partial view of the system 200 with the switch 102 operating in the triggered state 118, in accordance with an example implementation. As mentioned above and as shown in FIG. 2B, in the triggered state 118, the first terminal 117 and the second terminal 119 are connected or shorted, whereas the third terminal 121 and the fourth terminal 123 are disconnected.

When the first terminal 117 and the second terminal 119 are connected or shorted, the second terminal 119 is grounded. Therefore, the enable signal 204 is "LOW," and thus the motor control module 202 is disabled and stops supplying power (i.e., the control signal 115) to the motor 104, which then stops rotating. Also, the indication signal 113 is grounded.

As such, in the triggered state 118, the first terminal 117 and the second terminal 119 are shorted, thereby causing the motor 104 to stop and providing the proper or expected indication signal. In other words, the same position or state of the switch 102 (where the first terminal 117 and the second terminal 119 are shorted) causes the motor 104 to stop and provides the indication signal 113 indicative of the state of the motor 104. This way, motor control and the indication signal 113 are linked or coupled by the state of the switch 102, thereby eliminating the likelihood that an improper indication signal is provided. For instance, if either of the scenarios illustrated in Figures 1C and 1D occurs in the system 200 (i.e., the first terminal 117 is not shorted to the ground 114), the system 200 remains operating in the state shown in FIG. 2A because the enable signal 204 is "HIGH", and therefore continues supplying power to the motor 104 until the switch 102 is fully triggered to the triggered state 118 of FIG. 2B.

Notably, in the system 200, the indication signal 113 is connected to other electronic components, namely the motor control module 202 via the enable signal 204. Therefore, the system 200 includes another surge protection module 206 (i.e., a second surge protection module in addition to the surge protection module 110, which can be referred to as a first surge protection module). The surge protection module 206 is interposed between the indication signal 113 and the enable signal 204. This way, if a surge voltage occurs at the indication signal 113, the motor control module 202 is protected from such surge.

The surge protection module 206 can have several configurations. An example configuration is described next with respect to FIG. 3.

Figure 3:
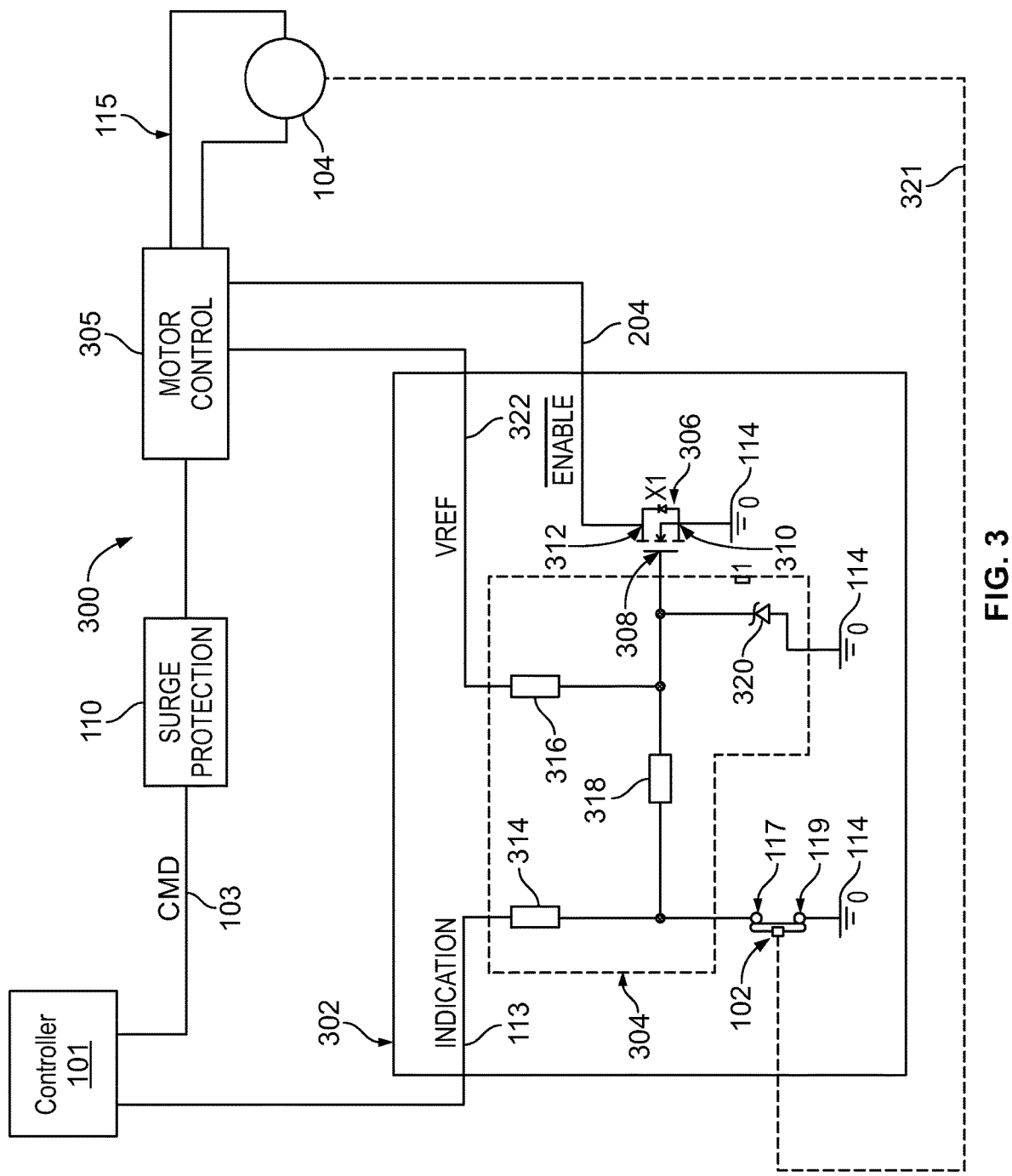
FIG. 3 illustrates a system having a circuit including a switch, in accordance with an example implementation.

FIG. 3 illustrates a system 300 having a circuit 302 including the switch 102, in accordance with an example implementation. The system 300 represents an example implementation of the system 200. Components of the system 300 that are similar to components of the systems 100, 200 are designated with the same reference numbers.

The switch 102 is represented symbolically in FIG. 3. Also, only the first terminal 117 and the second terminal 119 are illustrated in the symbolic representation of the switch 102.

The system 300 includes a surge protection module 304 and a motor control module 305. The surge protection module 304 represents an example implementation of the surge protection module 206 and the motor control module 305 represents an example implementation of the motor control module 202.

The circuit 302 includes the switch 102, the surge protection module 304, and a high-impedance switching element such as transistor 306. In examples, the transistor 306 can be included in the surge protection module 304. The transistor 306 is depicted as a metal-oxide-semiconductor field-effect transistor (MOSFET). However, other types of high impedance devices, e.g., Insulated Gate Bipolar Transistor, a Darlington bipolar transistor, or junction gate field-effect transistor (J-FET) can be used.

The transistor 306 has a gate 308, a source terminal 310 and a drain terminal 312. The transistor 306 is configured such that the voltage at the gate 308 of the transistor 306 determines whether the source terminal 310 is connected to the drain terminal 312. In the example implementation of FIG. 3, the enable signal 204 is connected to the drain terminal 312 and the source terminal 310 is connected to the ground 114.

The transistor 306 is a high-impedance switching element configured to connect the source terminal 310 to the drain terminal 312 when the voltage level at the gate 308 meets a threshold voltage value. Once such threshold voltage value is reached or exceeded, the gate 308 is biased "On" and the source terminal 310 is connected to the drain terminal 312. As long as the voltage level at the gate 308 is less than the threshold voltage value, the source terminal 310 is disconnected from the drain terminal 312. As such, the transistor 306 represents a high-input impedance device that isolates the enable signal 204 from the indication signal 113.

The surge protection module 304 includes a first impedance 314 electrically coupling the indication signal 113 to the switch 102, a second impedance 316 electrically coupling the motor control module 305 to the gate 308 of the transistor 306, and a third impedance 318 electrically coupling the gate 308 to the indication signal 113 (via the first impedance 314) and to the switch 102.

The surge protection module 304 also includes a diode 320 that electrically couples the gate 308 of the transistor 306 to the ground 114. The diode 320 is a semiconductor device that limits the voltage between the gate 308 and the source terminal 310 to a voltage level below a threshold voltage (i.e., the maximum gate-source voltage rating of the transistor 306).

As mentioned above, the switch 102 is configured to short the indication signal 113 to the ground 114 when the motor 104 has reached its desired or final position. As such, the switch 102 is configured as a sensor of the position of the motor 104. A connection 321 is configured to couple the motor 104 to the switch 102. For example, the connection 321 can include the cam 106 and the lever 108 described above or can include other mechanical means. In another example, the connection 321 comprises other means of sensing the desired position of the motor 104 (e.g., a reed relay and magnet) that can be used to facilitate sensing the position of the motor 104 by the switch 102.

As described above, when the switch 102 is opened or is in an "open" state (the state 116; see FIG. 2A), the motor 104 is free to turn. When the switch 102 is triggered to the desired position (i.e., switches to the triggered state 118 in FIG. 2B), the switch 102 is in a "closed" state and the desired position of the motor 104 has been reached. The motor 104 stops and the indication signal 113 is grounded via the first impedance 314 and the switch 102.

When the command signal 103 is applied or provided to the motor control module 305, the motor control module 305 provides a reference voltage signal 322 (VREF) to the circuit 302, i.e., to the surge protection module 304. Particularly, the reference voltage signal 322 is provided via the second impedance 316 to the gate 308 of the transistor 306. In the example implementation of FIG. 3, the reference voltage signal 322 is generated by the motor control module 305; however, in other example implementations, it may be generated from other components of the system.

If the voltage level of reference voltage signal 322 meets the threshold voltage value of the transistor 306, the gate 308 is biased by the reference voltage signal 322, and the source terminal 310 is connected to the drain terminal 312. As a result, the enable signal 204, which is active "LOW" in this example, is generated and provided to the motor control module 305 to drive the motor 104. In the example implementation of FIG. 3, the enable signal 204 is active (i.e., enables the motor control module 305 to drive the motor 104) when "LOW," i.e., when the drain terminal 312 is connected to the source terminal 310 (which is connected to the ground 114) and inactive when not connected to the ground 114. However, in other example implementations, the system 300 can be configured such that the enable signal 204 is active when "HIGH," e.g., the source terminal 310 can be connected to a source of voltage as opposed to ground and the motor control module 305 can be configured to drive the motor 104 when the enable signal 204 is "HIGH."

When the motor 104 reaches the desired position, a cam (e.g., the cam 106) or other mechanical or electrical mechanism comprised in the connection 321 causes the switch 102 to close (the first terminal 117 and the second terminal 119 are connected), thereby grounding the first impedance 314, the third impedance 318, and the switch 102. As a result, the gate 308 is connected to the ground via the third impedance 318 (i.e., biased "Off"), thereby disconnecting the source terminal 310 from the drain terminal 312 and disabling the motor control module 305 (i.e., the enable signal 204 no longer enables the motor control module 305). Further, the indication signal 113 is grounded (i.e., connected to the ground 114) via the first impedance 314 and the switch 102.

If a high voltage surge occurs (e.g., due to a lightning surge or similar event) at the indication signal 113 when the switch 102 is closed, the first impedance 314 limits the peak surge current through the switch 102 to a safe level. When the switch 102 is opened, the third impedance 318 and the diode 320 protect the transistor 306 from being damaged. Particularly, the third impedance 318 limits the peak surge current in the diode 320, and the diode 320 limits the voltage between the gate 308 and the source terminal 310.

In an example, the diode 320 is a Zener diode, which has a suitable breakdown voltage at low reverse current to protect the gate 308 of the transistor 306 from a high voltage surge without impairing operation of the transistor 306 during normal conditions. Thus, when the switch 102 is open and a high voltage occurs at the indication signal 113 and is communicated to the diode 320 via the first impedance 314 and the third impedance 318, the diode 320 may break down, limiting the voltage between the gate 308 and the source terminal 310 to protect the transistor 306. The diode 320 may break down at a second threshold voltage value that is higher than a first threshold voltage value that is required to bias the gate 308 in order to turn the transistor 306 ON but less than a voltage value that might damage the transistor 306. For example, the first threshold voltage value can be about 2-4 V, whereas the second threshold voltage value can be about 10 V. In example implementations, other components in addition to the diode 320 may be used in order to perform this function of protecting the gate 308 of the transistor 306 from high voltage. In other examples, alternative voltage clamping devices could be used instead of a diode. Other implementations using transistors such as bipolar transistors may require additional components to provide this protection.

The first impedance 314 of the surge protection module 304 can include a network of resistors, capacitors, and/or inductors. As an example for illustration, the first impedance 314 is a resistor the impedance of which is selected to achieve two goals. The first goal is to limit the voltage of the indication signal 113 for a given current flowing into the first impedance 314 when the switch 102 is closed. For instance, if the current into the indication signal 113 is 10 milliamperes (mA) and the maximum allowable voltage for the indication signal 113 is 1 Volt (V), then the resistance value of the resistor of the first impedance 314 can be selected to be less than 100 Ohm ((2).

The second goal is to limit the peak current passing through the first impedance 314 and the switch 102 during a high voltage surge at the indication signal 113. For example, if a high voltage surge pulse of 600 V is applied to the indication signal 113 for 1 millisecond (ms) and the peak current through the switch 102 is to be limited to 10 A, then the resistance value of the resistor is selected to be greater than 60 Ω. As such, if the first impedance 314 is a resistor, the resistor can have a value between 60 Ω and 100 Ω.

The third impedance 318 of the surge protection module 304 can similarly include a network of resistors, capacitors, and/or inductors. The impedance or resistance value of the third impedance 318 is selected according to the input impedance specifications for the indication signal 113 when the switch 102 is opened. For example, if the third impedance 318 is a resistor, with the proper selection of the second impedance 316, the diode 320, and the transistor 306, the value of the resistance of the third impedance 318 may be selected to exceed 100 Mega Ohm (MΩ), which is suitable for applications requiring high isolation impedance without a separate switch as used in conventional configurations.

Thus, the system 200, 300 may provide effective protection from high voltage surges that might occur in some applications (e.g., due to indirect lightning in an aerospace application). Particularly, the first impedance 314, the third impedance 318, and the diode 320 maintain a high or open impedance when the switch 102 is opened to protect the transistor 306, while maintaining closed continuity for the indication signal 113 when the switch 102 is closed.

Figure 4:
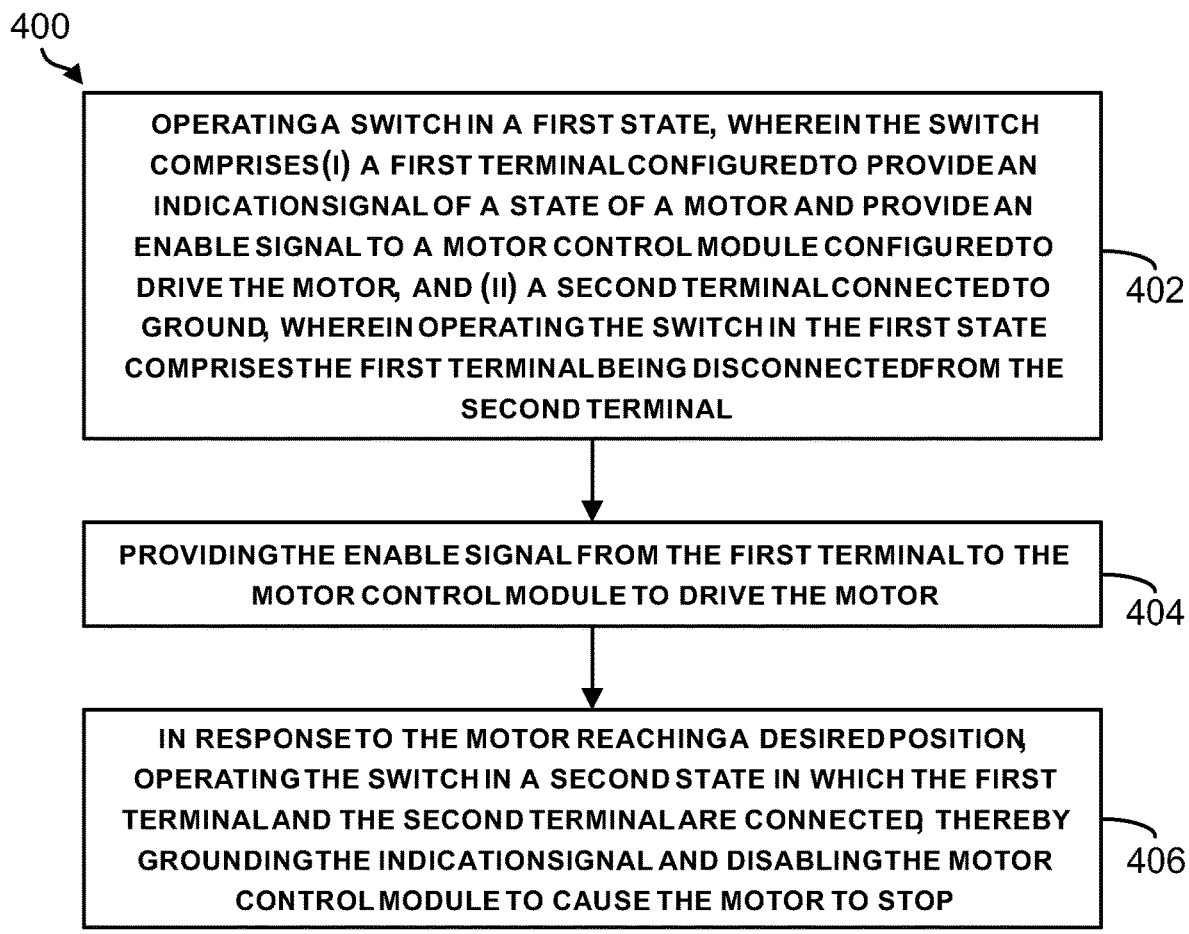
FIG. 4 is a flowchart of a method for operating a system, in accordance with an example implementation.

FIG. 4 is a flowchart of a method 400 for operating a system, in accordance with an example implementation. Method 400 shown in FIG. 4 presents an example of a method for operating the system 200 or the system 300, for example. FIGS. 5-8 are flowcharts showing additional operations executable with the method 400.

Further, processors, controllers, devices or systems may be used or configured to perform the operations presented in FIGS. 4-8. Method 400 may include one or more operations, functions, or actions as illustrated by one or more of blocks 402-406, 500-502, 600, 700-702, and 800-802. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

It should be understood that for this and other processes and methods disclosed herein, flowcharts show functionality and operation of one possible implementation of present examples. In this regard, each block or portions of each block may represent a module, a segment, or a portion of program code, which includes one or more instructions executable by a processor for implementing specific logical functions or steps in the process. The program code may be stored on any type of computer readable medium or data storage, for example, such as a storage device including a disk or hard drive. Further, the program code can be encoded on a computer-readable storage media in a machine-readable format, or on other non-transitory media or articles of manufacture. The computer readable medium may include non-transitory computer readable medium or memory, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a tangible computer readable storage medium, for example.

In addition, each block or portions of each block in FIGS. 4-8, and within other processes and methods disclosed herein, may represent circuitry that is wired to perform the specific logical functions in the process. Alternative implementations are included within the scope of the examples of the present disclosure in which functions may be executed out of order from that shown or discussed, including substantially concurrent or in reverse order, depending on the functionality involved, as would be understood by those reasonably skilled in the art.

At block 402, the method 400 includes operating the switch 102 in a first state (the state 116), wherein the switch 102 comprises (i) the first terminal 117 configured to provide the indication signal 113 of a state of the motor 104 and provide the enable signal 204 to the motor control module 202, 305 configured to drive the motor 104, and (ii) the second terminal 119 connected to ground 114, wherein operating the switch 102 in the first state comprises the first terminal 117 being disconnected from the second terminal 119.

At block 404, the method 400 includes providing the enable signal 204 from the first terminal 117 to the motor control module 202, 305 to drive the motor 104.

At block 406, the method 400 includes, in response to the motor 104 reaching a desired position, operating the switch 102 in a second state (e.g., the state 118) in which the first terminal 117 and the second terminal 119 are connected, thereby grounding the indication signal 113 and disabling the motor control module 202, 305 to cause the motor 104 to stop.

Figure 5:
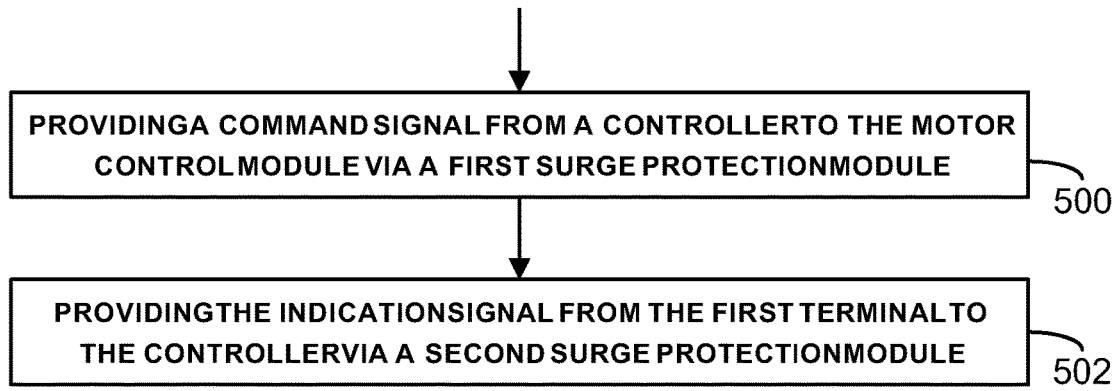
FIG. 5 is a flowchart of additional operations that may be executed and performed with the method of FIG. 4, in accordance with an example implementation.

FIG. 5 is a flowchart of additional operations that are executable with the method 400, in accordance with an example implementation. At block 500, the operations include providing the command signal 103 from the controller 101 to the motor control module 202, 305 via the first surge protection module 110. At block 502, the operations include providing the indication signal 113 from the first terminal 117 to the controller 101 via the second surge protection module 206, 304.

FIG. 6 is a flowchart of additional operations that are executable with the method 400, in accordance with an example implementation. At block 600, the operations include, in response to receiving the command signal 103 at the motor control module 305, generating the reference voltage signal 322, wherein providing the enable signal 204 comprises providing the enable signal 204 in response to the reference voltage signal 322 meeting a threshold voltage value and the switch 102 operating in the first state.

FIG. 7 is a flowchart of additional operations that are executable with the method 400, in accordance with an example implementation. At block 700, the operations include providing the reference voltage signal 322 to the gate 308 of the transistor 306, wherein the transistor 306 comprises the source terminal 310 and the drain terminal 312, wherein the drain terminal 312 is connected to the motor control module 305 to provide the enable signal 204 thereto. At block 702, the operation of providing the enable signal 204 comprises, when the reference voltage signal 322 meets the threshold voltage value and the switch 102 is operating in the first state, biasing the gate 308 of the transistor 306 with the reference voltage signal 322, thereby causing the source terminal 310 to be connected to the drain terminal 312 to provide the enable signal 204 to the motor control module 305.

In examples, the threshold voltage value is a first threshold voltage value, and the second surge protection module 304 comprises: (i) the first impedance 314 connecting the switch 102 to the indication signal 113, (ii) the second impedance 316 connecting the reference voltage signal 322 to the gate 308 of the transistor 306, (iii) the third impedance 318 connecting the first impedance 314 to the gate 308 of the transistor 306, and (iv) the diode 320 configured to limit voltage between the gate 308 and the source terminal 310 as voltage level at the gate 308 exceeds a second threshold voltage value.

FIG. 8 is a flowchart of additional operations that are executable with the method 400, in accordance with an example implementation. At block 800, the operations include connecting the third terminal 121 to the fourth terminal 123 when operating the switch 102 in the first state. At block 802, the operations include disconnecting the third terminal 121 from the fourth terminal 123 when operating the switch 102 in the second state.

The detailed description above describes various features and operations of the disclosed systems with reference to the accompanying figures. The illustrative implementations described herein are not meant to be limiting. Certain aspects of the disclosed systems can be arranged and combined in a wide variety of different configurations, all of which are contemplated herein.

Further, unless context suggests otherwise, the features illustrated in each of the figures may be used in combination with one another. Thus, the figures should be generally viewed as component aspects of one or more overall implementations, with the understanding that not all illustrated features are necessary for each implementation.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

Further, devices or systems may be used or configured to perform functions presented in the figures. In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions, such as when operated in a specific manner.

By the term "substantially" or "about" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

The arrangements described herein are for purposes of example only. As such, those skilled in the art will appreciate that other arrangements and other elements (e.g., machines, interfaces, operations, orders, and groupings of operations, etc.) can be used instead, and some elements may be omitted altogether according to the desired results. Further, many of the elements that are described are functional entities that may be implemented as discrete or distributed components or in conjunction with other components, in any suitable combination and location.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims, along with the full scope of equivalents to which such claims are entitled. Also, the terminology used herein is for the purpose of describing particular implementations only, and is not intended to be limiting.

Embodiments of the present disclosure can thus relate to one of the enumerated example embodiment (EEEs) listed below.

EEE 1 is a system comprising: a first surge protection module configured to receive a command signal: a motor control module configured to receive: (i) the command signal from the first surge protection module, and (ii) an enable signal, wherein the motor control module provides a control signal in response to the enable signal meeting a threshold value: a motor configured to receive the control signal from the motor control module: a switch coupled to the motor and configured to be triggered based on a state of the motor, wherein the switch comprises: (i) a first terminal configured to provide an indication signal of the state of the motor and provide the enable signal to the motor control module, and (ii) a second terminal connected to ground; and a second surge protection module coupled to the first terminal of the switch such that the indication signal is provided from the first terminal through the second surge protection module, wherein the switch is configured to operate in: (i) a first state wherein the first terminal and the second terminal are disconnected, thereby allowing the enable signal to be provided to the motor control module to drive the motor, and (ii) a second state triggered by the motor reaching a desired position causing the first terminal and the second terminal to be connected, thereby grounding the indication signal and disabling the motor control module to cause the motor to stop.

EEE 2 is the system of EEE 1, wherein, in response to receiving the command signal, the motor control module provides a reference voltage signal, wherein the enable signal is provided to the motor control module in response to the reference voltage signal meeting a threshold voltage value and the switch operating in the first state.

EEE 3 is the system of EEE 2, further comprising: a transistor comprising: (i) a gate connected to the reference voltage signal, (ii) a source terminal, and (iii) a drain terminal connected to the motor control module to provide the enable signal thereto, wherein when the reference voltage signal meets the threshold voltage value and the switch is operating in the first state, the gate of the transistor is biased, thereby causing the source terminal to be connected to the drain terminal to provide the enable signal to the motor control module.

EEE 4 is the system of EEE 3, wherein the second surge protection module comprises:

a first impedance connecting the switch to the indication signal; a second impedance connecting the reference voltage signal to the gate of the transistor; and a third impedance connecting the first impedance to the gate of the transistor.

EEE 5 is the system of EEE 4, wherein the threshold voltage value is a first threshold voltage value, and wherein the second surge protection module further comprises: a diode configured to limit voltage between the gate and the source terminal as voltage level at the gate exceeds a second threshold voltage value.

EEE 6 is the system of any of EEEs 4-5, wherein the first impedance comprises a resistor configured to: limit voltage of the indication signal for a given current flowing into the resistor when the switch is in the second state; and limit a peak current passing through the resistor and the switch when the switch is in the second state during a voltage surge at the indication signal.

EEE 7 is the system of any of EEEs 1-6, wherein the switch is coupled to the motor via a mechanical connection such that rotation of the motor to the desired position mechanically triggers the switch to operate in the second state.

EEE 8 is the system of EEE 7, wherein the mechanical connection comprises a cam and a lever, where rotation of the motor causes the cam to rotate, and wherein the cam moves the lever, thereby connecting the first terminal to the second terminal as the motor reaches the desired position.

EEE 9 is the system of any of EEEs 1-8, wherein the switch further comprises: a third terminal and a fourth terminal, wherein when the switch operates in the first state, the third terminal is connected to the fourth terminal, and wherein when the switch operates in the second state, the third terminal is disconnected from the fourth terminal.

EEE 10 is the system of any of EEEs 1-9, further comprising: a controller configured to: provide the command signal to the motor control module via the first surge protection module; and receive the indication signal from the first terminal of the switch via the second surge protection module.

EEE 11 is a circuit comprising: a switch configured to be coupled to a motor and configured to be triggered based on a state of the motor, wherein the switch comprises: (i) a first terminal configured to provide an indication signal of the state of the motor, and (ii) a second terminal connected to ground: a first impedance connecting the first terminal of the switch to the indication signal: a second impedance configured to receive a reference voltage signal from a motor control module of the motor; and a third impedance connected to the first impedance and the first terminal of the switch; and a transistor comprising: (i) a gate connected to the first terminal of the switch via the third impedance and connected to the reference voltage signal via the second impedance, (ii) a source terminal, and (iii) a drain terminal configured to be connected to the motor control module, wherein when the reference voltage signal meets a threshold voltage value and the switch is operating in a first state in which the first terminal is disconnected from the second terminal, the gate of the transistor is biased, thereby causing the source terminal to be connected to the drain terminal to provide an enable signal to the motor control module, and wherein the switch is configured to operate in a second state triggered by the motor reaching a desired position causing the first terminal and the second terminal to be connected, thereby grounding the indication signal and disabling the motor control module to cause the motor to stop.

EEE 12 is the circuit of EEE 11, wherein the threshold voltage value is a first threshold voltage value, and wherein the circuit further comprises: a diode configured to limit voltage between the gate and the source terminal when voltage level at the gate exceeds a second threshold voltage value.

EEE 13 is the circuit of any of EEEs 11-12, wherein the switch further comprises: a third terminal and a fourth terminal, wherein when the switch operates in the first state, the third terminal is connected to the fourth terminal, and wherein when the switch operates in the second state, the third terminal is disconnected from the fourth terminal.

EEE 14 is the circuit of any of EEEs 11-13, wherein the first impedance comprises a resistor configured to: limit voltage of the indication signal for a given current flowing into the resistor when the switch is in the second state; and limit a peak current passing through the resistor and the switch when the switch is in the second state during a voltage surge at the indication signal.

EEE 15 is a method comprising: operating a switch in a first state, wherein the switch comprises (i) a first terminal configured to provide an indication signal of a state of a motor and provide an enable signal to a motor control module configured to drive the motor, and (ii) a second terminal connected to ground, wherein operating the switch in the first state comprises the first terminal being disconnected from the second terminal: providing the enable signal from the first terminal to the motor control module to drive the motor; and in response to the motor reaching a desired position, operating the switch in a second state in which the first terminal and the second terminal are connected, thereby grounding the indication signal and disabling the motor control module to cause the motor to stop.

EEE 16 is the method of EEE 15, further comprising: providing a command signal from a controller to the motor control module via a first surge protection module; and providing the indication signal from the first terminal to the controller via a second surge protection module.

EEE 17 is the method of EEE 16. further comprising: in response to receiving the command signal at the motor control module, generating a reference voltage signal, wherein providing the enable signal comprises providing the enable signal in response to the reference voltage signal meeting a threshold voltage value and the switch operating in the first state.

EEE 18 is the method of EEE 17, further comprising: providing the reference voltage signal to a gate of a transistor, wherein the transistor comprises a source terminal and a drain terminal, wherein the drain terminal is connected to the motor control module to provide the enable signal thereto, wherein providing the enable signal comprises: when the reference voltage signal meets the threshold voltage value and the switch is operating in the first state, biasing the gate of the transistor with the reference voltage signal, thereby causing the source terminal to be connected to the drain terminal to provide the enable signal to the motor control module.

EEE 19 is the method of EEE 18, wherein the threshold voltage value is a first threshold voltage value, and wherein the second surge protection module comprises: a first impedance connecting the switch to the indication signal; a second impedance connecting the reference voltage signal to the gate of the transistor; a third impedance connecting the first impedance to the gate of the transistor; and a diode configured to limit voltage between the gate and the source terminal as voltage level at the gate exceeds a second threshold voltage value.

EEE 20 is the method of any of EEEs 15-19, wherein the switch further comprises: a third terminal and a fourth terminal, wherein: operating the switch in the first state comprises connecting the third terminal to the fourth terminal; and operating the switch in the second state comprises disconnecting the third terminal from the fourth terminal.

What is claimed is:

1. A system comprising:
 a first surge protection module configured to receive a command signal and limit voltage of the command signal when the command signal is subjected to a voltage surge;
 a motor control module configured to receive: (i) the command signal from the first surge protection module, and (ii) an enable signal, wherein the motor control module provides a control signal in response to the enable signal meeting a threshold value;
 a motor configured to receive the control signal from the motor control module;
 a switch coupled to the motor and configured to be triggered based on a state of the motor, wherein the switch comprises: (i) a first terminal configured to provide an indication signal of the state of the motor and provide the enable signal to the motor control module, and (ii) a second terminal connected to ground; and
 a second surge protection module coupled to the first terminal of the switch such that the indication signal is provided from the first terminal through the second surge protection module, wherein the switch is configured to operate in: (i) a first state wherein the first terminal and the second terminal are disconnected, thereby allowing the enable signal to be provided to the motor control module to drive the motor, and (ii) a second state triggered by the motor reaching a desired position causing the first terminal and the second terminal to be connected, thereby grounding the indication signal and disabling the motor control module to cause the motor to stop.

2. The system of claim 1, wherein, in response to receiving the command signal, the motor control module provides a reference voltage signal, wherein the enable signal is provided to the motor control module in response to the reference voltage signal meeting a threshold voltage value and the switch operating in the first state.

3. The system of claim 2, further comprising:
 a transistor comprising: (i) a gate connected to the reference voltage signal, (ii) a source terminal, and (iii) a drain terminal connected to the motor control module to provide the enable signal thereto, wherein when the reference voltage signal meets the threshold voltage value and the switch is operating in the first state, the gate of the transistor is biased, thereby causing the source terminal to be connected to the drain terminal to provide the enable signal to the motor control module.

4. The system of claim 3, wherein the second surge protection module comprises:
 a first impedance connecting the switch to the indication signal;
 a second impedance connecting the reference voltage signal to the gate of the transistor; and
 a third impedance connecting the first impedance to the gate of the transistor.

5. The system of claim 4, wherein the threshold voltage value is a first threshold voltage value, and wherein the second surge protection module further comprises:
 a diode configured to limit voltage between the gate and the source terminal as voltage level at the gate exceeds a second threshold voltage value.

6. The system of claim 4, wherein the first impedance comprises a resistor configured to:
 limit voltage of the indication signal for a given current flowing into the resistor when the switch is in the second state; and
 limit a peak current passing through the resistor and the switch when the switch is in the second state during a voltage surge at the indication signal.

7. The system of claim 1, wherein the switch is coupled to the motor via a mechanical connection such that rotation of the motor to the desired position mechanically triggers the switch to operate in the second state.

8. The system of claim 7, wherein the mechanical connection comprises a cam and a lever, where rotation of the motor causes the cam to rotate, and wherein the cam moves the lever, thereby connecting the first terminal from the second terminal as the motor reaches the desired position.

9. The system of claim 1, wherein the switch further comprises: a third terminal and a fourth terminal, wherein when the switch operates in the first state, the third terminal is connected to the fourth terminal, and wherein when the switch operates in the second state, the third terminal is disconnected from the fourth terminal.

10. The system of claim 1, further comprising:
 a controller configured to:
  provide the command signal to the motor control module via the first surge protection module; and
  receive the indication signal from the first terminal of the switch via the second surge protection module.

11. A circuit comprising:
 a switch configured to be coupled to a motor and configured to be triggered based on a state of the motor, wherein the switch comprises: (i) a first terminal configured to provide an indication signal of the state of the motor, and (ii) a second terminal connected to ground;
 a first impedance connecting the first terminal of the switch to the indication signal;
 a second impedance configured to receive a reference voltage signal from a motor control module of the motor;
 a third impedance connected to the first impedance and the first terminal of the switch; and
 a transistor comprising: (i) a gate connected to the first terminal of the switch via the third impedance and connected to the reference voltage signal via the second impedance, (ii) a source terminal, and (iii) a drain terminal configured to be connected to the motor control module, wherein when the reference voltage signal meets a threshold voltage value and the switch is operating in a first state in which the first terminal is disconnected from the second terminal, the gate of the transistor is biased, thereby causing the source terminal to be connected to the drain terminal to provide an enable signal to the motor control module, and wherein the switch is configured to operate in a second state triggered by the motor reaching a desired position causing the first terminal and the second terminal to be connected, thereby grounding the indication signal and disabling the motor control module to cause the motor to stop.

12. The circuit of claim 11, wherein the threshold voltage value is a first threshold voltage value, and wherein the circuit further comprises:
a diode configured to limit voltage between the gate and the source terminal when voltage level at the gate exceeds a second threshold voltage value.

13. The circuit of claim 11, wherein the switch further comprises: a third terminal and a fourth terminal, wherein when the switch operates in the first state, the third terminal is connected to the fourth terminal, and wherein when the switch operates in the second state, the third terminal is disconnected from the fourth terminal.

14. The circuit of claim 11, wherein the first impedance comprises a resistor configured to:
limit voltage of the indication signal for a given current flowing into the resistor when the switch is in the second state; and
limit a peak current passing through the resistor and the switch when the switch is in the second state during a voltage surge at the indication signal.

15. A method comprising:
operating a switch in a first state, wherein the switch comprises (i) a first terminal configured to provide an indication signal of a state of a motor and provide an enable signal to a motor control module configured to drive the motor, and (ii) a second terminal connected to ground, wherein operating the switch in the first state comprises the first terminal being disconnected from the second terminal;
providing the enable signal from the first terminal to the motor control module to drive the motor;
in response to the motor reaching a desired position, operating the switch in a second state in which the first terminal and the second terminal are connected, thereby grounding the indication signal and disabling the motor control module to cause the motor to stop;
providing a command signal from a controller to the motor control module via a first surge protection module configured to limit voltage of the command signal when the command signal is subjected to a voltage surge; and
providing the indication signal from the first terminal to the controller via a second surge protection module.

16. The method of claim 15, further comprising:
in response to receiving the command signal at the motor control module, generating a reference voltage signal, wherein providing the enable signal comprises providing the enable signal in response to the reference voltage signal meeting a threshold voltage value and the switch operating in the first state.

17. The method of claim 16, further comprising:
providing the reference voltage signal to a gate of a transistor, wherein the transistor comprises a source terminal and a drain terminal, wherein the drain terminal is connected to the motor control module to provide the enable signal thereto, wherein providing the enable signal comprises:
when the reference voltage signal meets the threshold voltage value and the switch is operating in the first state, biasing the gate of the transistor with the reference voltage signal, thereby causing the source terminal to be connected to the drain terminal to provide the enable signal to the motor control module.

18. The method of claim 17, wherein the threshold voltage value is a first threshold voltage value, and wherein the second surge protection module comprises:
a first impedance connecting the switch to the indication signal;
a second impedance connecting the reference voltage signal to the gate of the transistor;
a third impedance connecting the first impedance to the gate of the transistor; and
a diode configured to limit voltage between the gate and the source terminal as voltage level at the gate exceeds a second threshold voltage value.

19. The method of claim 15, wherein the switch further comprises: a third terminal and a fourth terminal, wherein:
operating the switch in the first state comprises connecting the third terminal to the fourth terminal; and
operating the switch in the second state comprises disconnecting the third terminal from the fourth terminal.

* * * * *